(12) United States Patent
Jaradi et al.

(10) Patent No.: US 11,027,694 B2
(45) Date of Patent: Jun. 8, 2021

(54) SEATBELT PRETENSIONER ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 16/401,723

(22) Filed: May 2, 2019

(65) Prior Publication Data

US 2020/0346615 A1    Nov. 5, 2020

(51) Int. Cl.
*B60R 22/46* (2006.01)
*B60R 21/013* (2006.01)

(52) U.S. Cl.
CPC ........ *B60R 22/4623* (2013.01); *B60R 21/013* (2013.01); *B60R 2022/4666* (2013.01)

(58) Field of Classification Search
CPC . B60R 22/46; B60R 22/4604; B60R 22/4623; B60R 22/1951; B60R 22/1952; B60R 22/1953
See application file for complete search history.

(56) References Cited

U.S. PATENT DOCUMENTS

| 5,299,830 A | 4/1994 | Hanna et al. |
| 5,409,176 A | 4/1995 | Kopetzky |
| 5,628,470 A | 5/1997 | Ray et al. |
| 8,469,400 B2 | 6/2013 | Merrill et al. |
| 2018/0319361 A1* | 11/2018 | Faruque ................. B60R 22/22 |
| 2019/0217814 A1* | 7/2019 | Jaradi ..................... B60R 22/41 |
| 2019/0337482 A1* | 11/2019 | Grzic ................. B60R 22/1952 |

FOREIGN PATENT DOCUMENTS

| EP | 0635407 B1 | 9/1997 | |
| GB | 2323769 A | * 10/1998 | ......... B60R 22/1952 |

* cited by examiner

*Primary Examiner* — Paul N Dickson
*Assistant Examiner* — Caitlin Anne Miller
(74) *Attorney, Agent, or Firm* — Frank A. MacKenzie; Bejin Bieneman PLC

(57) ABSTRACT

A seatbelt pretensioner assembly includes a body. The seatbelt pretensioner assembly includes a shaft rotatably supported by the body. The seatbelt pretensioner assembly includes a spring operatively engaged between the body and the shaft. The seatbelt pretensioner assembly includes a solenoid supported by the body and movable between a first position inhibiting rotation of the shaft relative to the body and a second position permitting rotation of the shaft relative to the body.

17 Claims, 6 Drawing Sheets

SEATBELT PRETENSIONER ASSEMBLY

BACKGROUND

A seatbelt portion of a vehicle restraint system secures an occupant of a vehicle against movement that may result from a vehicle collision. The seatbelt functions by reducing the force of occupant impacts with vehicle interior structures. In this role, the seatbelt applies loads across the chest or lap of the occupant. Controlling or reducing these loads may assist in seatbelt functionality.

DETAILED DESCRIPTION

Figure 1:
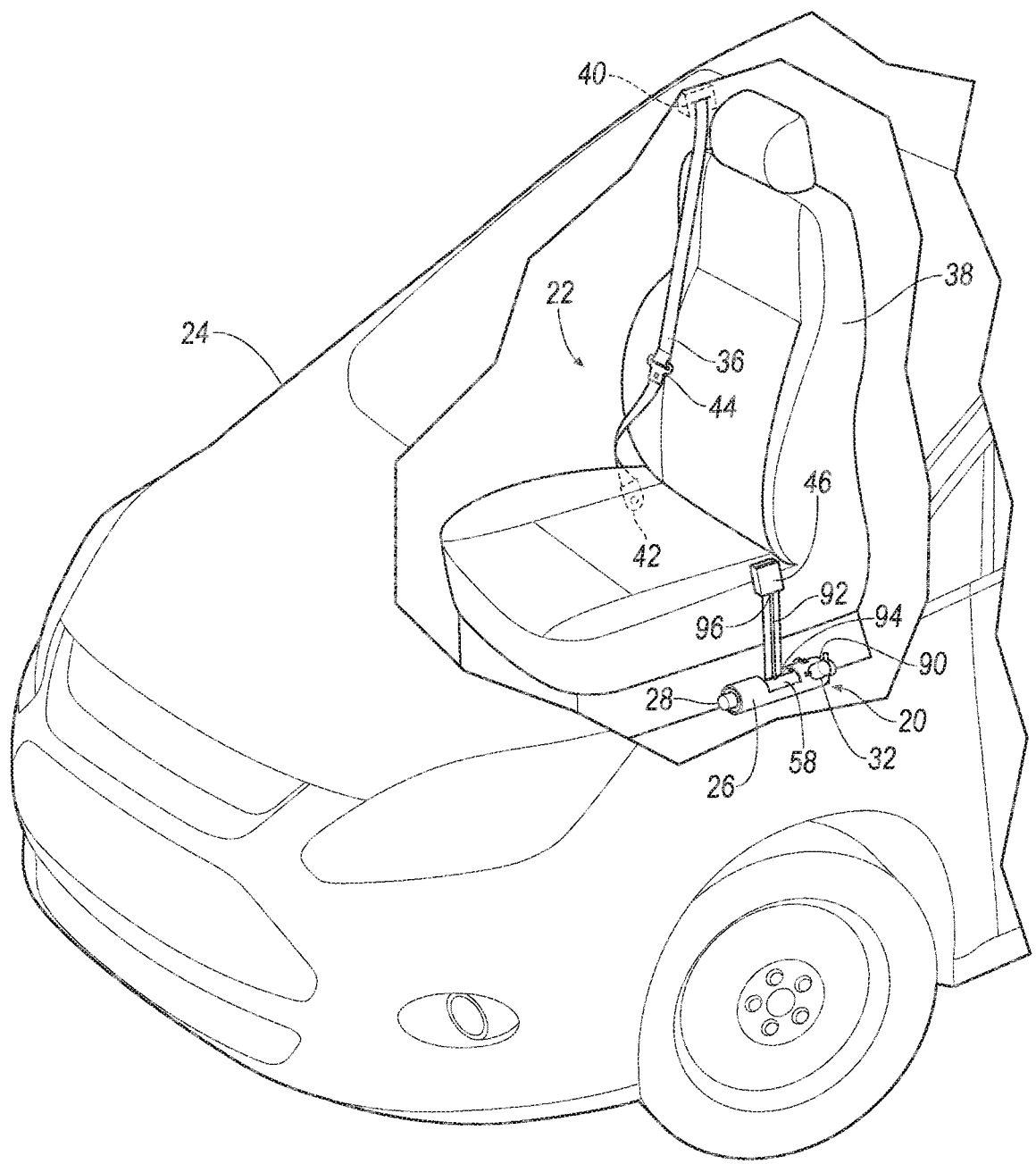
FIG. 1 is a perspective view of a vehicle having a pretensioner assembly.

A seatbelt pretensioner assembly includes a body. The seatbelt pretensioner assembly includes a shaft rotatably supported by the body. The seatbelt pretensioner assembly includes a spring operatively engaged between the body and the shaft. The seatbelt pretensioner assembly includes a solenoid supported by the body and movable between a first position inhibiting rotation of the shaft relative to the body and a second position permitting rotation of the shaft relative to the body.

The seatbelt pretensioner assembly may include a cable connected to the shaft.

The seatbelt pretensioner assembly may include a buckle connected to the cable.

The shaft may be rotatable about an axis, and the cable may extend radially from the shaft relative to the axis.

The cable may be wound around the shaft.

The seatbelt pretensioner assembly may include teeth extending from and surrounding the shaft.

The solenoid in the first position may abut at least one of the teeth.

The solenoid in the second position may be spaced from the teeth.

The teeth and the shaft may be monolithic.

The seatbelt pretensioner assembly may include a ratchet mechanism supported by the body and operatively engaged with the teeth.

The ratchet mechanism may include an arm and a second spring.

The arm may be pivotally supported by the body.

The arm may be supported at an outer surface of the body.

The body may define an opening and the arm may extend through the opening.

The shaft may define a hole, the spring in the hole.

The body may define a notch, the spring in the notch.

The seatbelt pretensioner assembly may include a handle supported by the shaft.

The body may define a passage, the shaft in the passage.

The body may define a window open to the passage.

With reference to the Figures, wherein like numerals indicate like parts throughout the several views, a seatbelt pretensioner assembly 20 for a seatbelt assembly 22 of a vehicle 24 includes a body 26. The seatbelt assembly 22 includes a shaft 28 rotatably supported by the body 26. The seatbelt assembly 22 includes a spring 30 operatively engaged between the body 26 and the shaft 28. The seatbelt assembly 22 includes a solenoid 32 supported by the body 26 and movable between a first position inhibiting rotation of the shaft 28 relative to the body 26 and a second position permitting rotation of the shaft 28 relative to the body 26.

The solenoid 32 and the spring 30 provide tension to the seatbelt assembly 22. For example, a computer 34 may actuate the solenoid 32 to move to the second position in response to detecting an impact to the vehicle 24. Moving the solenoid 32 to the second position permits rotation of the shaft 28 relative to the body 26. Permitting rotation of the shaft 28 allows torque from the spring 30 to rotate the shaft 28 and apply tension to the seatbelt assembly 22, e.g., to a webbing 36 of the seatbelt assembly 22. The tension aids in controlling kinematics of an object restrained by the seatbelt assembly 22. The solenoid 32 and the spring 30 enable the pretensioner assembly 20 to be used for multiple impacts without the combustion or destruction of materials, such as pyrotechnics and inflators.

The vehicle 24 includes a passenger cabin to house occupants, if any, of the vehicle 24. The passenger cabin includes one or more seats 38. The seats 38 are shown to be bucket seats, but the seats 38 may be other types. The position and orientation of the seats 38 and components thereof may be adjustable by an occupant.

The seatbelt assembly 22 restrains an occupant of one of the seats 38. The seatbelt assembly 22 may include a retractor 40. The webbing 36 is selectively payable from the retractor 40. For example, the webbing 36 is payable from the retractor 40 during normal operation of the vehicle 24 and payout is restricted during a vehicle collision. The retractor 40 may be fixed to a floor of the vehicle 24, a pillar of the vehicle 24, a roof of the vehicle 24, one of the seats 38, etc. The seatbelt assembly 22 may include one or more anchors 42. The anchors 42 support the webbing 36 and position the webbing 36 relative to one of the seats 38. For example, the anchor 42 may define a slot and the webbing 36 may be slidably disposed within the slot. As another example, the anchor 42 may be fixed to an end of the webbing 36. The anchor 42 be fixed to the floor of the vehicle 24, the pillar of the vehicle 24, the roof of the vehicle 24, one of the seats 38, etc. The seatbelt assembly 22 may include a latch plate 44. The latch plate 44 may be supported by and slidable along the webbing 36. The seatbelt assembly 22 may include a buckle 46 configured to receive the latch plate 44. For example, the latch plate 44 may engage with the buckle 46 upon inserting of the latch plate 44 into the buckle 46. The buckle 46 may inhibit removal of the latch plate 44, e.g., until actuation of a latch of the buckle 46 that permits removal of the latch plate 44. The webbing 36 may be fabric in the form of a strap. The latch plate 44 engaged with the buckle 46 may divide the webbing 36 into a lap band and a shoulder band. The seatbelt assembly 22 may be a three-point harness, meaning that the webbing 36 is attached at three points around the occupant when fastened. The seatbelt assembly 22 may, alternatively, include another arrangement of attachment points.

The pretensioner assembly 20 increases tension of the webbing 36 of the seatbelt assembly 22. For example, the pretensioner assembly 20 may urge the buckle 46, the anchor 42, etc., away from the occupant of the seat 38, e.g., toward the floor of the vehicle 24. The pretensioner assembly 20 may be fixed to the floor or any other suitable component of the vehicle 24.

The body 26 supports other components of the pretensioner assembly 20. The body 26 may be fixed to the floor, e.g., via fastener, weld, etc., or any other suitable component of the vehicle 24. The body 26 may be elongated between a first distal end 48 and a second distal end 50. The body 26 may be elongated along an axis A1. In other words, the first distal end 48 and the second distal end 50 may be spaced from each other and on the axis A1. The body 26 may include an outer surface 52 that faces away from the axis A1. The body 26 may include an inner surface 54 opposite the outer surface 52. In other words, the inner surface 54 faces the axis A1.

The body 26 may define a passage 56. The passage 56 may be defined by the inner surface 54. The passage 56 may extend along the axis A1, e.g., between the first distal end 48 and the second distal end 50. The passage 56 may extend from the first distal end 48 to the second distal end 50. In other words, the passage 56 may be open at the first distal end 48 and the second distal end 50.

The body 26 may define a window 58 open to the passage 56. For example, the window 58 may extend from the outer surface 52 to the inner surface 54. The window 58 may be between the first distal end 48 and the second distal end 50. The window 58 may be spaced from the first distal end 48 and the second distal end 50.

The body 26 may define an opening 60. The opening 60 provides access to the passage 56. The opening 60 may extend from the outer surface 52 to the inner surface 54. The opening 60 may be proximate the first distal end 48, e.g., closer to the first distal end 48 and the second distal end 50. The opening 60 may be between the window 58 and the first distal end 48.

Figure 3:
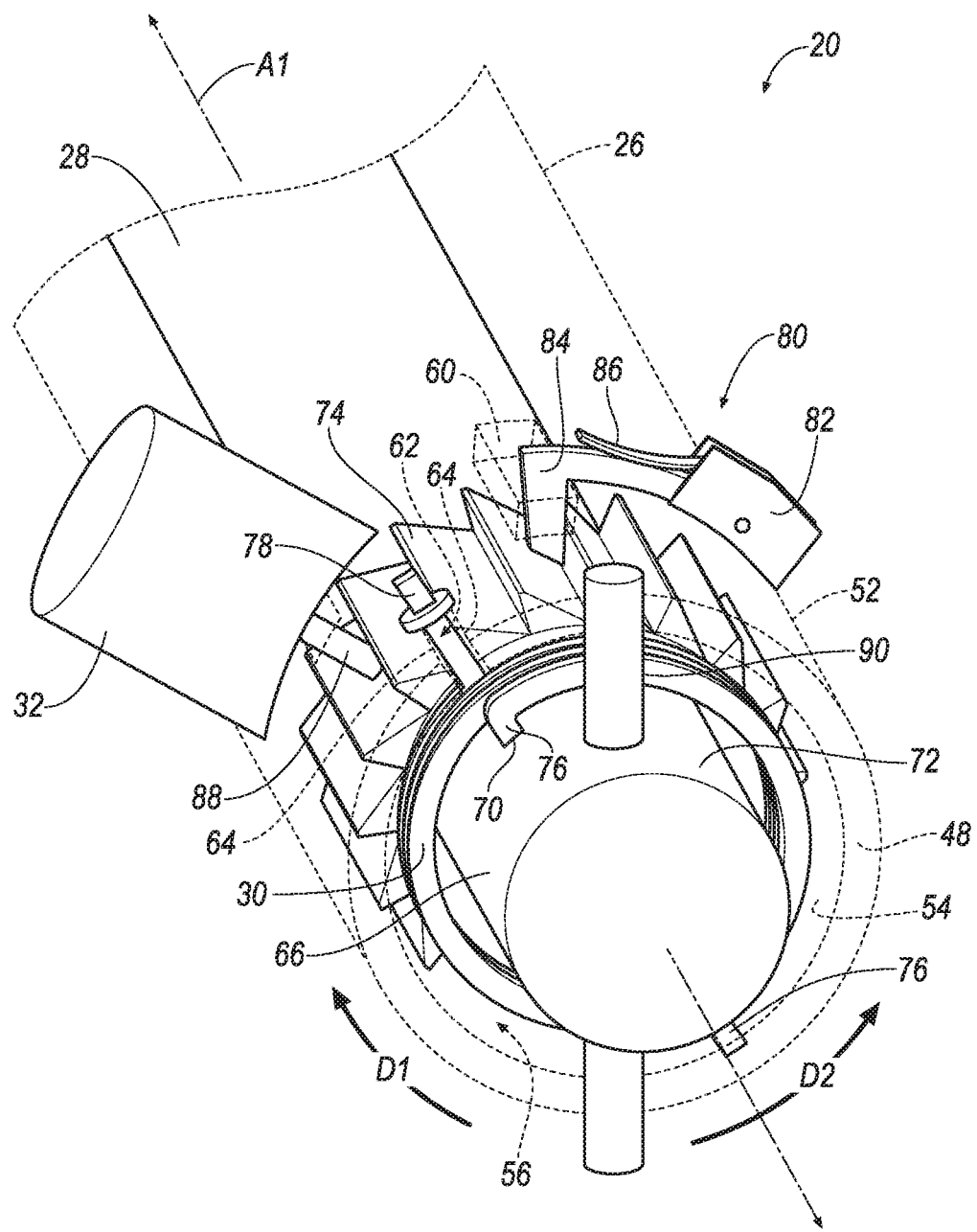
FIG. 3 is a perspective view of the pretensioner assembly.

The body 26 may define a notch 62, shown in FIG. 3. The notch 62 may extend from the first distal end 48 toward the second distal end 50. The notch 62 may extend from the inner surface 54 toward the outer surface 52. The notch 62 may extend from the inner surface 54 to the outer surface 52. The notch 62 may be defined by a pair of side walls 64 of the body 26, the side walls 64 spaced from each other circumferentially relative to the axis A1.

The shaft 28 may be elongated between a first end 66 and a second end 68. The shaft 28 may be elongated along the axis A1. In other words, the first end 66 and the second end 68 may be spaced from each other and on the axis A1. The shaft 28 may be cylindrical. The shaft 28 may be metal or any suitable material.

The shaft 28 is rotatably supported by the body 26, e.g., supported in the passage 56 via bushing, bearing, slip fit, etc., and rotatable relative to the body 26 about the axis A1. The shaft 28 may extend from within the passage 56 to outside the passage 56. The example, the shaft 28 may extend from within the passage 56 away from the second distal end 50 of the body 26 and beyond the first distal end 48. As another example, the first end 66 of the shaft 28 may be outside of the passage 56.

The shaft 28 may define a hole 70. The hole 70 may extend perpendicular to the axis A1. The hole 70 may extend from an outer surface 72 of the shaft 28 toward the axis A1. The hole 70 may extend completely through the shaft 28. The hole 70 may be at the first end 66 of the shaft 28.

A plurality of teeth 74 may extend from the shaft 28. The teeth 74 surround the shaft 28, i.e., circumferentially relative to the axis A1. The teeth 74 may be at a common position on the shaft 28 along the axis A1. In other words, the teeth 74 may be spaced from the first distal end 48, the second distal end 50, etc., by a same distance as each other. The teeth 74 and the shaft 28 may be monolithic, i.e., a one-piece unit without any fasteners, joints, welding, adhesives, etc., fixing the shaft 28 and the teeth 74 to each other.

The spring 30 is operatively engaged between the body 26 and the shaft 28 to apply relative torque therebetween. The spring 30 stores mechanical energy when it is twisted. Generally, when the spring 30 is twisted the spring 30 exerts a torque in an opposite direction, the torque proportional to the amount (angle) the spring 30 is twisted. For example, the spring 30 may be a spiral wound torsion spring (sometimes called a "clock spring") or any suitable type. The spring 30 may be in the passage 56. The spring 30 may surround the shaft 28. The spring 30 may include a first end 76 and a second end 78 opposite the first end 76. The first end 76 of the spring 30 may be in the hole 70 of the shaft 28. The spring 30 may extend through the shaft 28. Torque from the spring 30 may be applied to the shaft 28 via normal forces between a perimeter of the opening 60 and the first end 76 of the spring 30. The second end 78 of the spring 30 may be in the notch 62 of the body 26, e.g., between the side walls 64. Torque from the spring 30 may be applied to the body 26 via normal forces between the side walls 64 and the second end 78 of the spring 30.

The pretensioner assembly 20 may include a ratchet mechanism 80 that permits rotation of the shaft 28 relative to the body 26 in a first direction D1 and restricts rotation of the shaft 28 in a second direction D2 opposite the first direction D1. The ratchet mechanism 80 may be supported by the body 26, e.g., fixed to the outer surface 52 of the body 26. The ratchet mechanism 80 may be operatively engaged with the teeth 74 to restrict rotation of the shaft 28 relative to the body 26, e.g., in the second direction D2.

The ratchet mechanism 80 may include a base 82 supporting other components of the ratchet mechanism 80. The base 82 may be fixed to the outer surface 52 of the body 26. The body 26 and the base 82 may be monolithic.

The ratchet mechanism 80 may include an arm 84. The arm 84 may be pivotally supported by the body 26, e.g., via the base 82. For example, a pin may connect the base 82 and the arm 84. The pin may allow rotational motion of the arm 84 relative to the base 82. The arm 84 may rotate to move toward and away from the axis A1. For example, normal forces between a first surface of the arm 84 and a first surface of one of the teeth 74 may urge the arm 84 away from the axis A1, permitting rotation of the shaft 28 in the first direction D1. As another example, an operator may grasp the arm 84 and urge the arm 84 away from the teeth 74, permitting rotation of the shaft in the first direction D1 and the second direction D2. The arm 84 may be supported at the outer surface 52 of the body 26. The arm 84 may be outside the passage 56. The arm 84 may extend through the opening 60. For example, the arm 84 in the first position may extend from outside the passage 56 to the passage 56 and abut the teeth 74.

The ratchet mechanism 80 may include a spring 86. The spring 86 may urge the arm 84 toward the shaft 28. The arm 84 urged toward the shaft 28 may restrict rotation of the shaft 28 in the second direction D2, e.g., via normal forces between a second surface of the arm 28 and a second surface of one of the teeth 74. The spring 86 may be a cantilever spring fixed to the base 82 and abutting the arm 84.

The solenoid 32 selectively permits and restricts rotation of the shaft 28 relative to the body 26, e.g., in the second direction D2. The solenoid 32 is movable to the first position inhibiting rotation of the shaft 28 relative to the body 26, shown in FIG. 4A. The solenoid 32 in the first position may abut at least one of the teeth 74. For example, the solenoid 32 may include a pin 88 that is extended in the first position and abuts at least one of the teeth 74. The solenoid 32 is movable to the second position permitting rotation of the shaft 28 relative to the body 26, shown in FIG. 4B. The solenoid 32 in the second position may be spaced from the teeth 74. For example, the pin 88 of the solenoid 32 may be retracted in the second position and spaced from the teeth 74.

The solenoid 32 is supported by the body 26. For example, the solenoid 32 may be fixed to the outer surface 52 of the body 26. The pin 88 of the solenoid 32 may extend through an opening in the body 26 into the passage 56 and to the teeth 74.

The solenoid 32 may move to the first position and/or the second position, e.g., in response to a command from the computer 34. The solenoid 32 is an electromagnetic solenoid, i.e., that selectively generates a magnetic field to move to the first position and/or the second position.

The pretensioner assembly 20 may include a handle 90 supported by the shaft 28. The handle 90 enables a human to apply to torque to the shaft 28, e.g., to energize the spring 30. The handle 90 may be at the first end 66 of the shaft 28. The handle 90 may extend radially from the shaft 28, e.g., relative to the axis A1.

A cable 92 may transfer rotation of the shaft 28 to tension on the webbing 36. For example, the cable 92 may be elongated between a first end 94 and a second end 96. The first end 94 may be connected to the shaft 28. For example, the first end 94 of the cable 92 may be fixed to a threaded fastener that is engaged with a threaded opening of the shaft 28. The second end 96 of the cable 92 may be connected, e.g., fixed to, the buckle 46. Alternatively, the second end 96 of the cable 92 may be connected to the anchor 42, e.g., between the anchor 42 and the floor.

Figure 2:
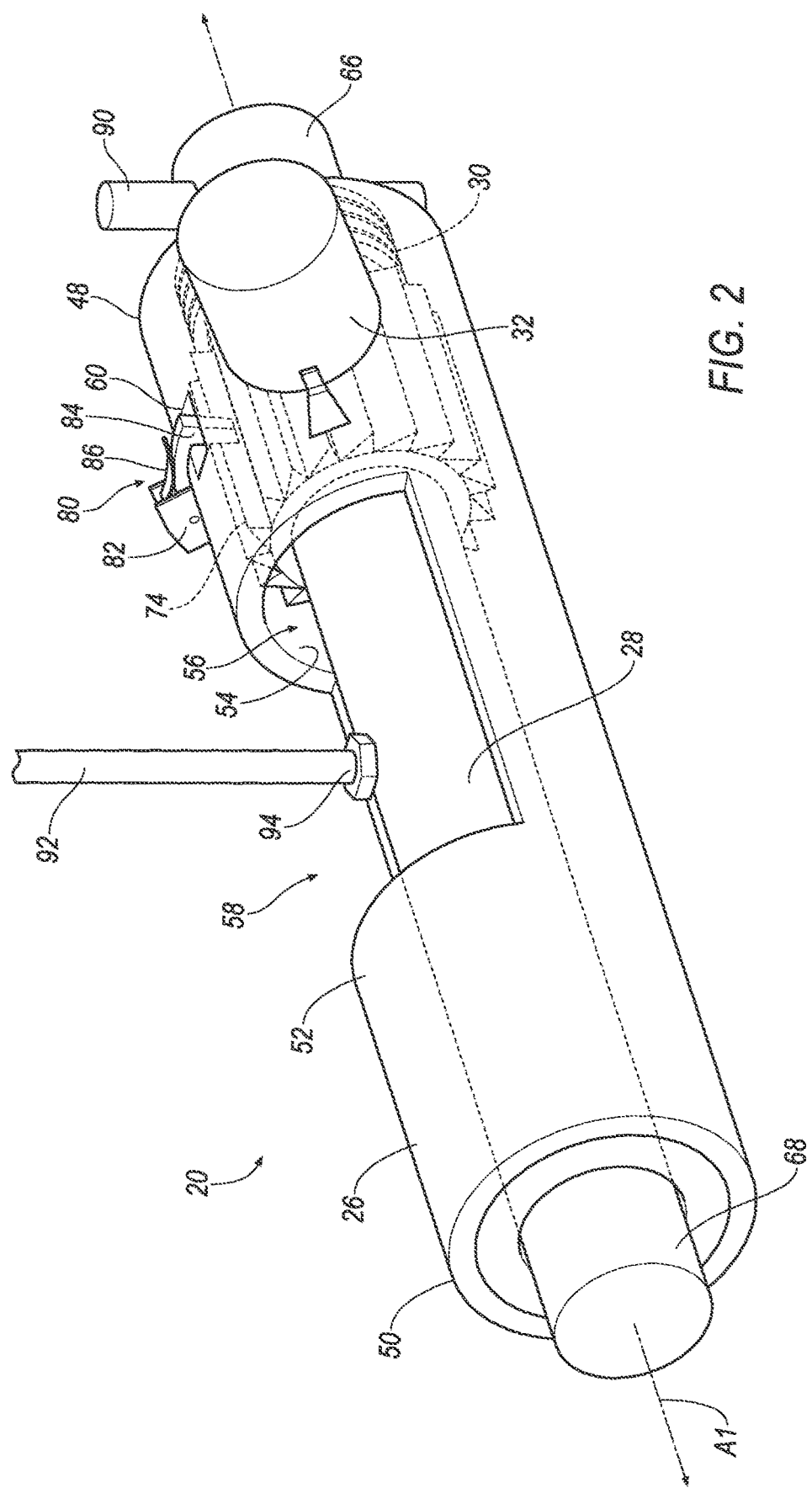
FIG. 2 is a perspective view of the pretensioner assembly.
Figure 4A:
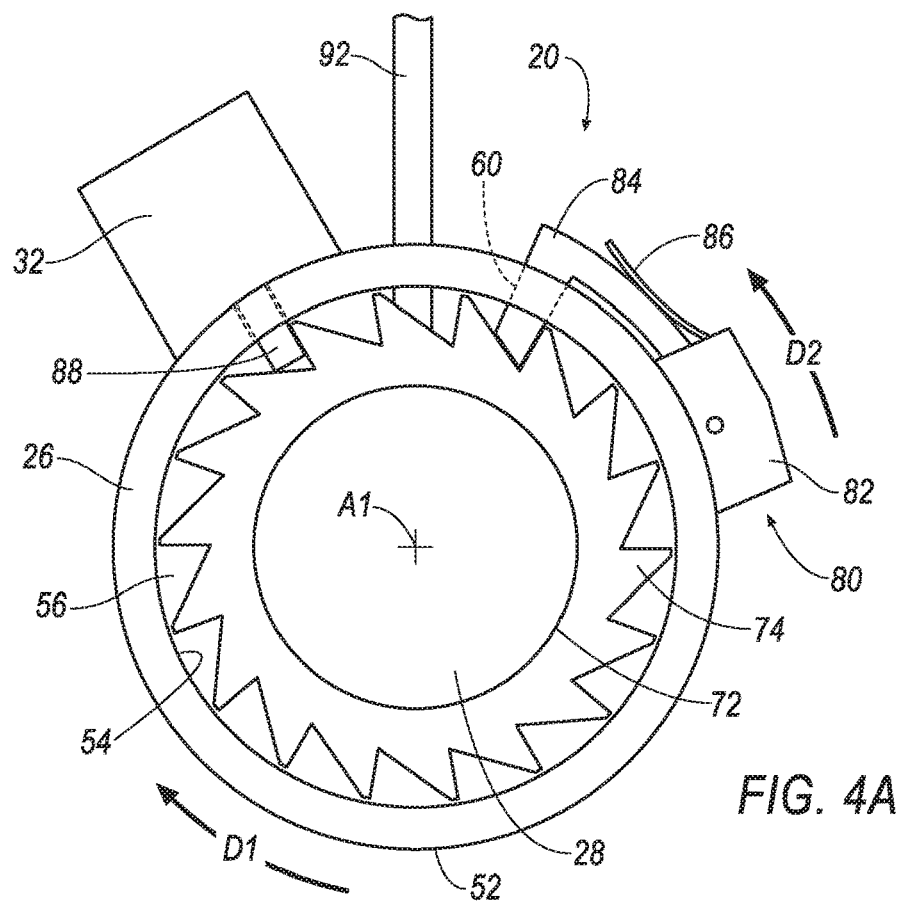
FIG. 4A is a cross section of the pretensioner assembly with a solenoid inhibiting rotation of a shaft of the pretensioner assembly.
Figure 4B:
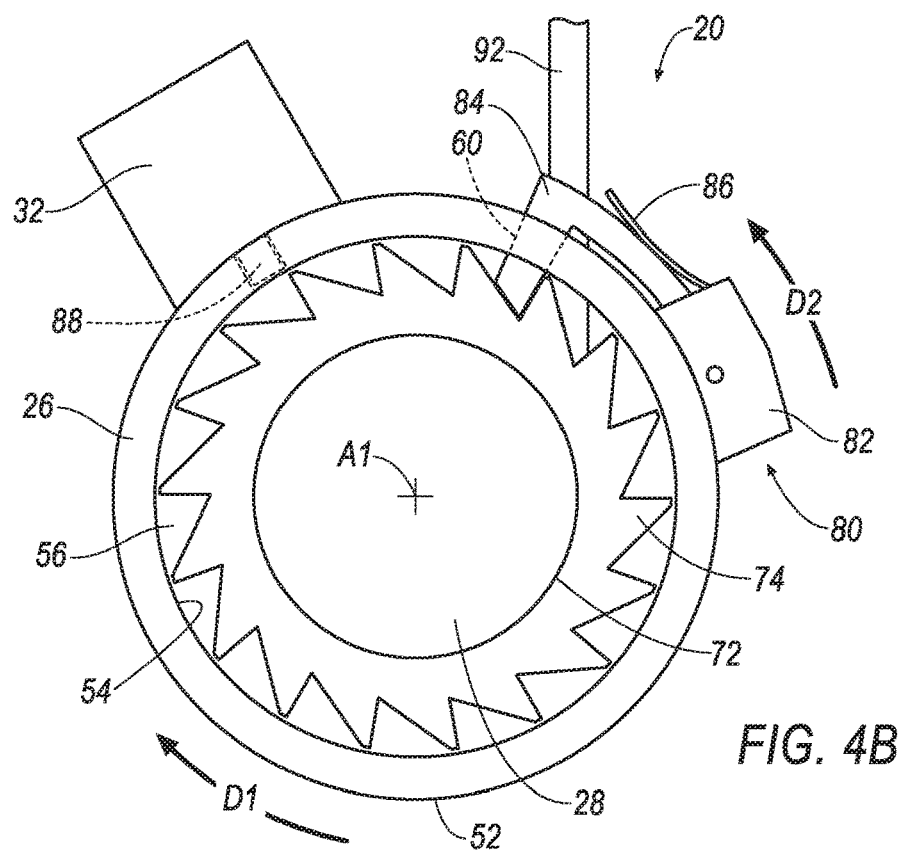
FIG. 4B is a cross section of the pretensioner assembly with the solenoid permitting rotation of the shaft of the pretensioner assembly.
Figure 5:
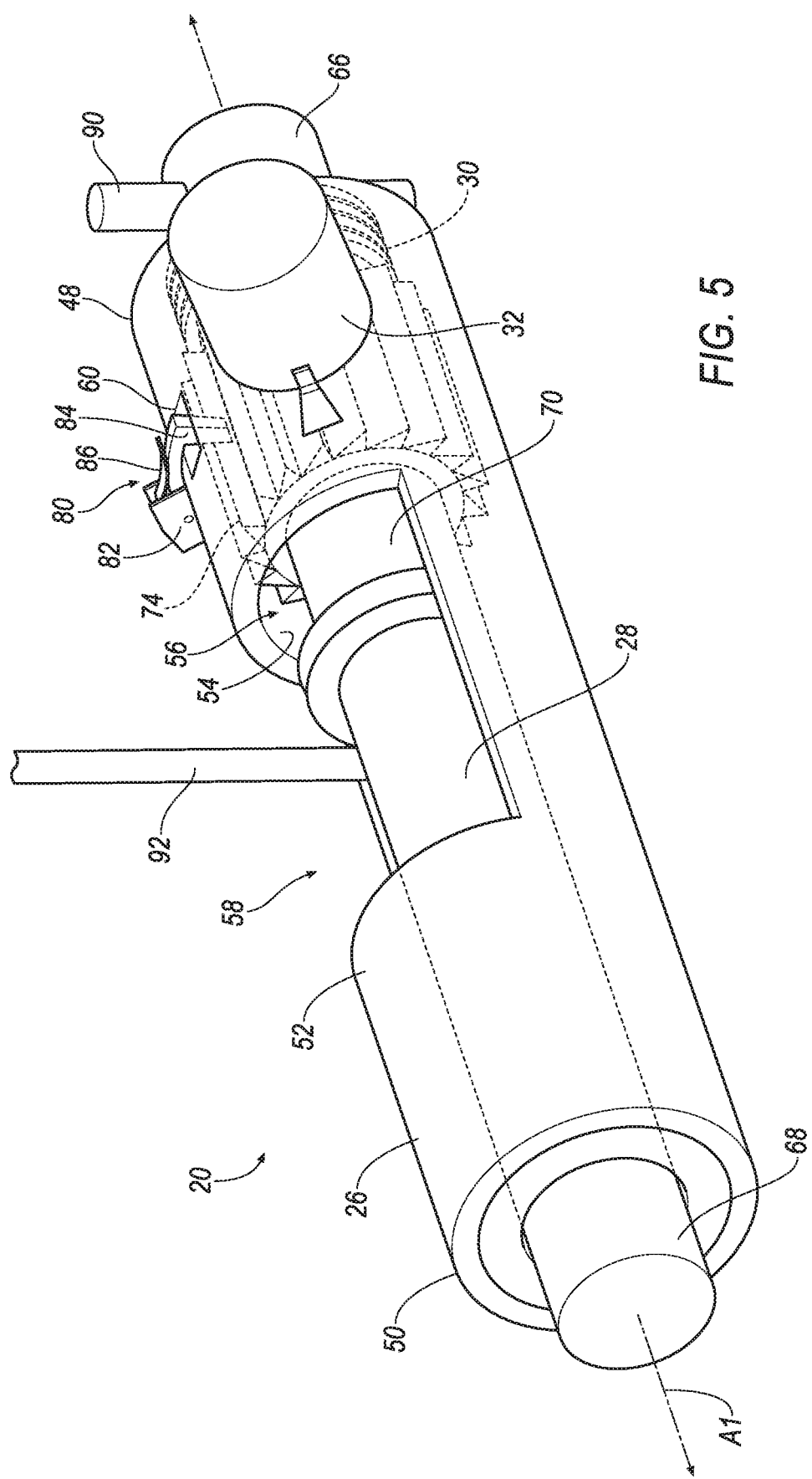
FIG. 5 is a perspective view of the pretensioner assembly.
Figure 6:
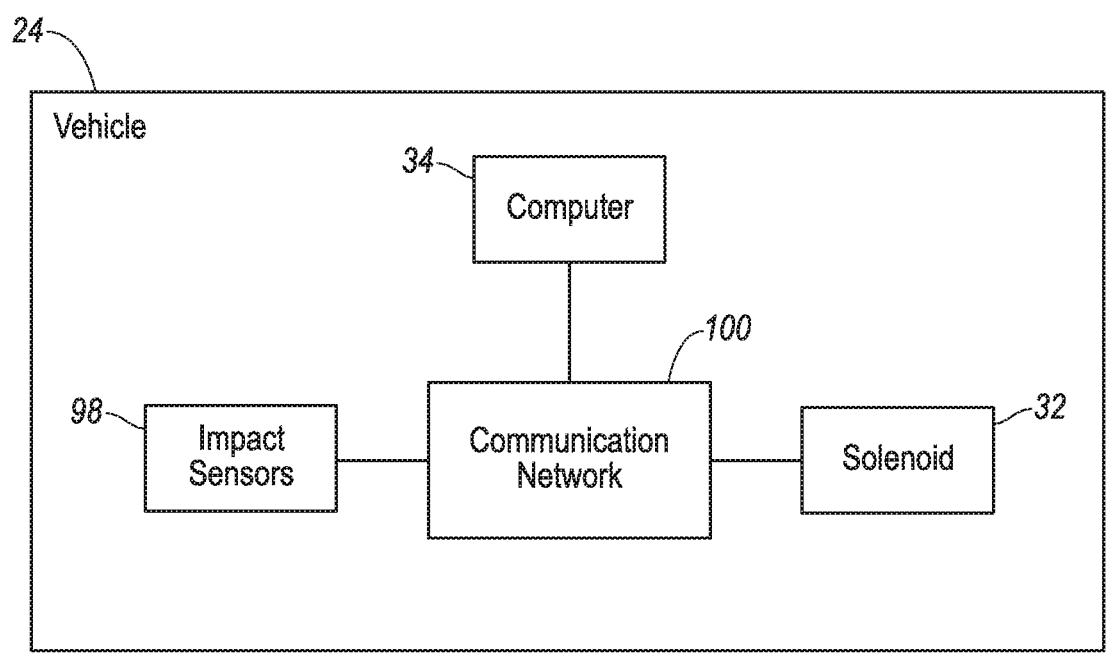
FIG. 6 is a block diagram of components of the vehicle

The cable 92 may extend through the window 58. The cable 92 may extend radially from the shaft 28 relative to the axis A1, as shown in FIGS. 2 and 4A. In other words, the cable 92 may extend away from the shaft 28 perpendicular to the axis A1 and normal to a tangential plane at the outer surface 52 of the shaft 28. The cable 92 may be wound around the shaft 28, as shown in FIGS. 4B and 5. In other words, the cable 92 may wrap around the outer surface 52 of the shaft 28.

The vehicle 24 includes an impact sensor 98 programmed to detect an impact to the vehicle 24. The impact sensor 98 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 98 may be located at numerous points in or on the vehicle 24.

The computer 34 may be a microprocessor-based computer implemented via circuits, chips, or other electronic components. For example, the computer 34 may include a processor, memory, etc. The memory of the computer 34 may include memory storing instructions executable by the processor to perform the functions described herein, as well as for electronically storing data and/or databases.

The vehicle 24 may include a communication network 100. The communication network 100 includes hardware, such as a communication bus, for facilitating communication among components such as the computer 34, the impact sensor 98, the solenoid 32, etc. The communication network 100 may facilitate wired or wireless communication among the components in accordance with a number of communication protocols such as controller area network (CAN), Ethernet, WiFi, Local Interconnect Network (LIN), and/or other wired or wireless mechanisms.

The computer 34 may be programmed to actuate the solenoid 32 to the first position and the second position, e.g., by transmitting a command to the solenoid 32 via the communication network 100. The computer 34 may actuate the solenoid 32 in response to receiving data from the impact sensor 98 indicating that an impact to the vehicle 24 is pending, occurring, or has occurred.

A method for configuring the pretensioner assembly 20 for use during normal operation of the vehicle 24 includes moving the ratchet mechanism 80, e.g., the arm 84, away from the shaft 28, and the solenoid 32 to the second position permitting rotation of the shaft 28 relative to the body 26. Next, the shaft 28 is rotated in the second direction D2, energizing the spring 30. Then, the ratchet mechanism 80, e.g., the arm 84, is moved toward the shaft 28, and the solenoid 32 is moved to the first position, restricting rotation of the shaft 28 relative to the body 26.

In the event of the computer 34 receiving data from the impact sensor 98 indicating that an impact to the vehicle 24 is pending, occurring, or has occurred an impact, the computer 34 may transmit a command through the communication network 100 to the solenoid 32 commanding moment to the first/second position. In response, the solenoid 32 moves to the second position, permitting rotation of the shaft 28 in the first direction D1. The cable 92 is wound around the shaft 28 as the shaft 28 rotates, urging the buckle 46 downward and generating tension in the webbing 36. The ratchet mechanism 80 restricts subsequent rotation of the shaft 28 in the second direction D2, maintaining tension in the webbing 36. After the impact, the method for configuring the pretensioner assembly 20 for use may again be performed, enabling the pretensioner assembly 20 to be used for multiple impacts without the combustion or destruction of materials, such as pyrotechnics and inflators.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt pretensioner assembly, comprising:
   a body;
   a shaft rotatably supported by the body;
   teeth extending from and surrounding the shaft;
   a ratchet mechanism supported by the body and operatively engaged with the teeth;
   a spring operatively engaged between the body and the shaft; and
   a solenoid supported by the body and movable between a first position inhibiting rotation of the shaft relative to the body and a second position permitting rotation of the shaft relative to the body.

2. The seatbelt pretensioner assembly of claim 1, further comprising a cable connected to the shaft.

3. The seatbelt pretensioner assembly of claim 2, further comprising a buckle connected to the cable.

4. The seatbelt pretensioner assembly of claim 2, wherein the shaft is rotatable about an axis, and the cable extends radially from the shaft relative to the axis.

5. The seatbelt pretensioner assembly of claim 2, wherein the cable is wound around the shaft.

6. The seatbelt pretensioner assembly of claim 1, wherein the solenoid in the first position abuts at least one of the teeth.

7. The seatbelt pretensioner assembly of claim 1, wherein the solenoid in the second position is spaced from the teeth.

8. The seatbelt pretensioner assembly of claim 1, wherein the teeth and the shaft are monolithic.

9. The seatbelt pretensioner assembly of claim 1, wherein the ratchet mechanism includes an arm and a second spring.

10. The seatbelt pretensioner assembly of claim 9, wherein the arm is pivotally supported by the body.

11. The seatbelt pretensioner assembly of claim 9, wherein the arm is supported at an outer surface of the body.

12. The seatbelt pretensioner assembly of claim 11, wherein the body defines an opening and the arm extends through the opening.

13. The seatbelt pretensioner assembly of claim 1, wherein the shaft defines a hole, the spring in the hole.

14. The seatbelt pretensioner assembly of claim 1, wherein the body defines a notch, the spring in the notch.

15. The seatbelt pretensioner assembly of claim 1, further comprising a handle supported by the shaft.

16. The seatbelt pretensioner assembly of claim 1, wherein the body defines a passage, the shaft in the passage.

17. The seatbelt pretensioner assembly of claim 16, wherein the body defines a window open to the passage.

\* \* \* \* \*